United States Patent
Jung et al.

(10) Patent No.: US 9,582,486 B2
(45) Date of Patent: Feb. 28, 2017

(54) APPARATUS AND METHOD FOR CLASSIFYING AND ANALYZING DOCUMENTS INCLUDING TEXT

(71) Applicant: LG CNS CO., LTD., Seoul (KR)

(72) Inventors: In Chul Jung, Seoul (KR); JaeMan Kim, Seoul (KR); Hyunpyo Kim, Seoul (KR); Sunmin Yun, Seoul (KR); Chorong Yoon, Seoul (KR); Seentae Lee, Seoul (KR); Yoo Jin Chang, Seoul (KR); Tae-Chang Jee, Seoul (KR)

(73) Assignee: LC CNS CO., LTD., Seoul (KR)

( * ) Notice: Subject to any disclaimer, the term of this patent is extended or adjusted under 35 U.S.C. 154(b) by 242 days.

(21) Appl. No.: 14/276,725

(22) Filed: May 13, 2014

(65) Prior Publication Data

US 2015/0331847 A1    Nov. 19, 2015

(51) Int. Cl.
*G06F 17/30* (2006.01)
*G06F 17/27* (2006.01)

(52) U.S. Cl.
CPC .............. *G06F 17/27* (2013.01); *G06F 17/277* (2013.01); *G06F 17/2755* (2013.01); *G06F 17/30678* (2013.01); *G06F 17/30705* (2013.01); *G06F 17/30731* (2013.01)

(58) Field of Classification Search
CPC .................... G06F 17/30613; G06F 17/30011; G06F 17/30864; G06F 17/30678; G06F 17/30705; G06F 17/30731
USPC ................................. 707/711, 729, 736, 739
See application file for complete search history.

(56) References Cited

U.S. PATENT DOCUMENTS

| | | | | |
|---|---|---|---|---|
| 6,216,123 | B1 * | 4/2001 | Robertson | G06F 17/30622 707/999.003 |
| 6,366,908 | B1 * | 4/2002 | Chong | G06F 17/30616 707/999.003 |
| 6,470,334 | B1 * | 10/2002 | Umemoto | G06F 17/30011 707/999.001 |
| 8,380,697 | B2 | 2/2013 | Benyamin et al. | |
| 8,504,550 | B2 | 8/2013 | Hall et al. | |
| 2006/0294099 | A1 * | 12/2006 | Tsukamoto | G06F 17/30707 707/999.007 |
| 2009/0276411 | A1 | 11/2009 | Park et al. | |
| 2011/0025842 | A1 * | 2/2011 | King | G06F 17/211 348/135 |
| 2012/0078907 | A1 * | 3/2012 | Kokubu | G06F 17/3064 707/737 |

FOREIGN PATENT DOCUMENTS

KR    10-2002-0072140 A    9/2002

* cited by examiner

*Primary Examiner* — Vincent Boccio (57) ABSTRACT

A document classification and analysis system includes a processor, a memory including one or more storage regions, and a non-transitory computer-readable medium having stored thereon instructions that, when executed, cause the processor to perform a method. The method includes receiving a document including a plurality of words, performing morpheme analysis on the document to extract original forms of the words, tagging each of the words based on a corresponding part-of-speech, determining location information of the words based on an order of the words in the document, applying one or more lexicon lists to the document to classify each of the words, and storing the location information.

18 Claims, 7 Drawing Sheets

APPARATUS AND METHOD FOR CLASSIFYING AND ANALYZING DOCUMENTS INCLUDING TEXT

BACKGROUND

The background section provided herein is for the purpose of generally presenting the context of the disclosure. Work of the presently named inventors, to the extent the work is described in this section, as well as aspects of the description that may not otherwise qualify as prior art at the time of filing, are neither expressly nor impliedly admitted as prior art against the present disclosure.

In existing methods for classifying and analyzing records or documents including text, the frequency of the appearance of terms (or words) in a document has been used to determine key terms (or keywords). The document is classified or analyzed by matching frequently appearing terms, i.e., the key terms, with a provided set of terms.

When categorizing a document including text using only the frequency of terms, it is difficult to find the correlation between terms since the frequency of each term is separately calculated.

BRIEF SUMMARY

Embodiments of the present disclosure relate to textual classification and analysis systems, and in particular, to systems and methods for classifying words in a document by considering lexical characteristics of the words and an order of the words in the document. Embodiments are directed to analyzing the document using query rules generated based on a correlation between the words.

An embodiment of the present disclosure is directed to a system and method for classifying words in a text document including text by determining location information of the words according to a word order in the text document and storing the location information of the words in corresponding storage regions based on lexical characteristics of the words.

An embodiment of the present disclosure is directed to a system and method for generating query rules based on a correlation between locations of words in a text document and analyzing the document using the query rules.

In accordance with an aspect of the present disclosure, a document classification and analysis system includes a processor, a memory including one or more storage regions, and a non-transitory computer-readable medium having stored thereon instructions that, when executed, cause the processor to perform a method. The method includes receiving a document including a plurality of words, performing morpheme analysis on the document to extract original forms of the words, tagging each of the words based on a corresponding part-of-speech, determining location information of the words based on an order of the words in the document, applying one or more lexicon lists to the document to classify each of the words, and storing the location information.

The location information of the words may be stored in at least one of the plurality of storage regions in the memory, the one or more storage regions corresponding to the one or more lexicon lists, respectively.

The one or more lexicon lists may include one or more of a part-of-speech tag list, a sentimental word list, a keyword list, and an inverse word list. The keyword list may include one or more sections, each section corresponding to a field, and keywords in each section may be generated based on validated resources associated with the corresponding field.

Determining the location information may further include applying sequential numbers to the words based on the order of the words, and The location information of each word may include the sequential number applied to a corresponding word.

The non-transitory computer-readable medium may further include instructions that, when executed, cause the processor to apply at least one query rule to at least one document including words, determine whether or not the document satisfies the query rule, and output a document analysis result, the document analysis result including a result of the determination of whether or not the document satisfies the query rule. The query rule may be applied to the document using the location information of the words stored in the memory.

Any of the one or more lexicon lists and query rules to be applied to the document may be updated based on the document analysis result. The query rule may include at least one Boolean operator and at least one target word. The query rule may be defined by a correlation between target words based on the location information of the target words.

In accordance with another aspect of the present disclosure, a document classification and analysis method includes receiving a document including a plurality of words; performing morpheme analysis on the words of the document to extract original forms of the words, tagging each of the words based on a corresponding a part-of-speech to each of the words, determining location information of each of the words based on an order of the words in the document, applying one or more lexicon lists to the document to classify the words, and storing the location information in a storage unit based on the classification of the words.

Determining the location information may include sequentially numbering the words according to the order of the words, and the location information of each word may include the sequential number applied to a corresponding word.

Storing the location information may include storing the location information of the words in at least one of one or more storage regions in the storage unit, the one or more storage regions corresponding to the one or more lexicon lists, respectively.

The document classification and analysis method may further include applying one or more query rules to a plurality of documents including the document to determine whether or not each of the documents satisfy each of the query rules, and outputting the determination results as document analysis results.

In accordance with still another aspect of the present disclosure, a non-transitory computer readable medium has a computer program for causing a computer to perform document classification and analysis, and the computer readable medium includes code for receiving a document including a plurality of words, code for extracting original forms of the words, code for tagging each of the words based on a corresponding part-of-speech, code for determining location information of the words based on an order of the words in the document, code for applying one or more lexicon lists to the document to classify the words, code for storing the location information based on the classification of the words, code for applying one or more query rules to a plurality of documents including the document, code for determining documents, which satisfy each of the query rules, among the plurality of documents, and code for outputting desired documents selected from the determined documents.

BRIEF DESCRIPTION OF THE DRAWINGS

Various embodiments of this disclosure will be described with reference to the following figures, wherein like numerals reference like elements, and wherein.

DETAILED DESCRIPTION

The details of one or more embodiments are set forth in the accompanying drawings and the description below. Other features, aspects, and advantages may become apparent from the description, the drawings, and the claims.

Embodiments are directed to systems and methods for classifying and analyzing documents including words or text. Hereinafter, such documents may be referred to as "text documents." However, this term is not intended to be limiting, and simply refers to any document including at least one word. The term does not exclude, for example, documents including other information, such as figures, graphical representations, or the like.

Figure 1:
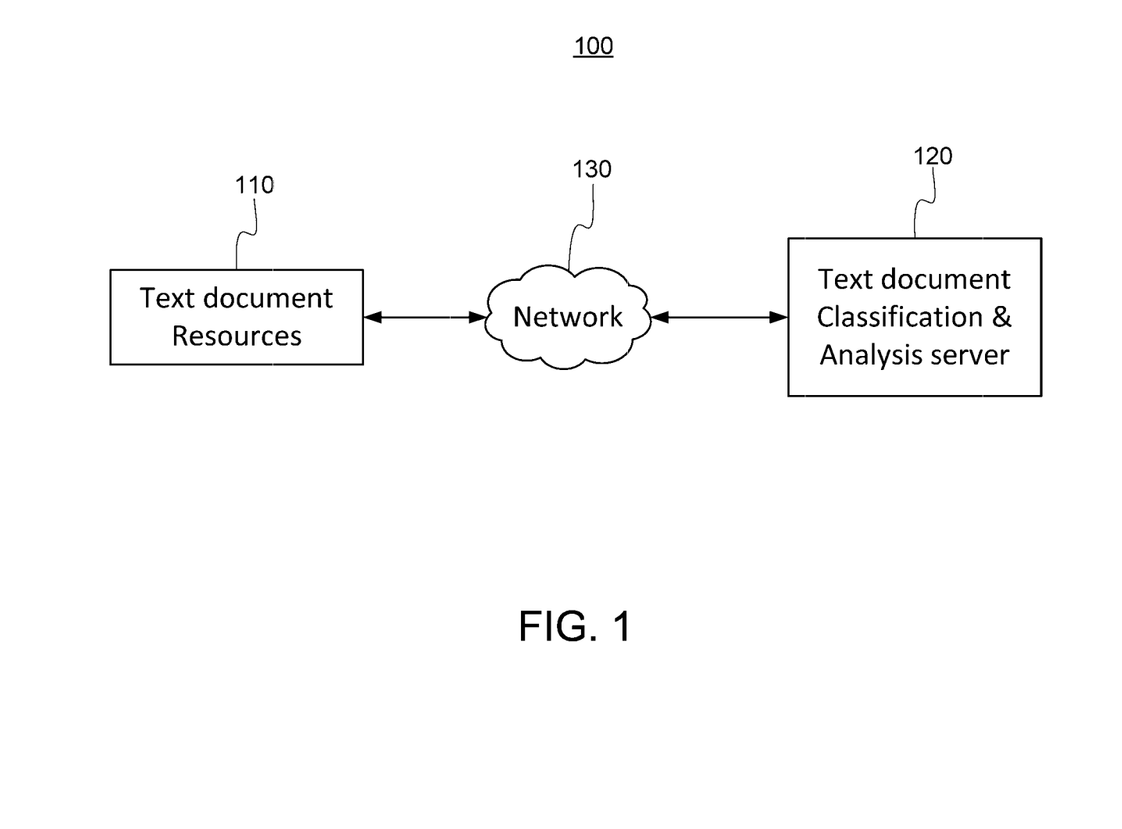
FIG. 1 illustrates a system for text document classification and analysis in accordance with an embodiment of the present disclosure.

FIG. 1 illustrates a system for text document classification and analysis in accordance with an embodiment of the present disclosure. The system 100 includes a plurality of text document resources 110, a text document classification and analysis server 120, and a network 130. The text document classification and analysis server 120 is in communication with the plurality of text document resources 110 via the network 130.

The text document classification and analysis server 120 gathers a large number of text documents from the plurality of text document resources 110. The plurality of text document resources 110 includes, for example, the World Wide Web, databases of professional documents such as medical or legal documents, e-mail service providers, social network service (SNS) providers, and so on. The network 130 may include a wireless or wired communication network.

The text document classification and analysis server 120 classifies text terms (or words) in a text document based on a structural correlation between the words within the text document. The structural correlation between words is based on the order of words in a text document (i.e., a word order), and includes, for example, whether or not a first word precedes a second word, whether a distance between the first word and the second word is in a predetermined range, and the like.

In an embodiment, the text document classification and analysis server 120 sequentially numbers words according to the order of their appearance in the text document to determine the word order, and stores the sequential numbers applied to the words in corresponding storage regions as location information.

The text document classification and analysis server 120 also generates query rules based on lexical characteristics of words and/or the structural correlation between words, and analyzes text documents using the query rules to find desired text document(s). In an embodiment, the lexical characteristics of words include the part of speech of each word, whether or not each word is a sentimental word, whether or not each word is a keyword, whether or not each word is useful for document analysis, and so on.

Figure 2:
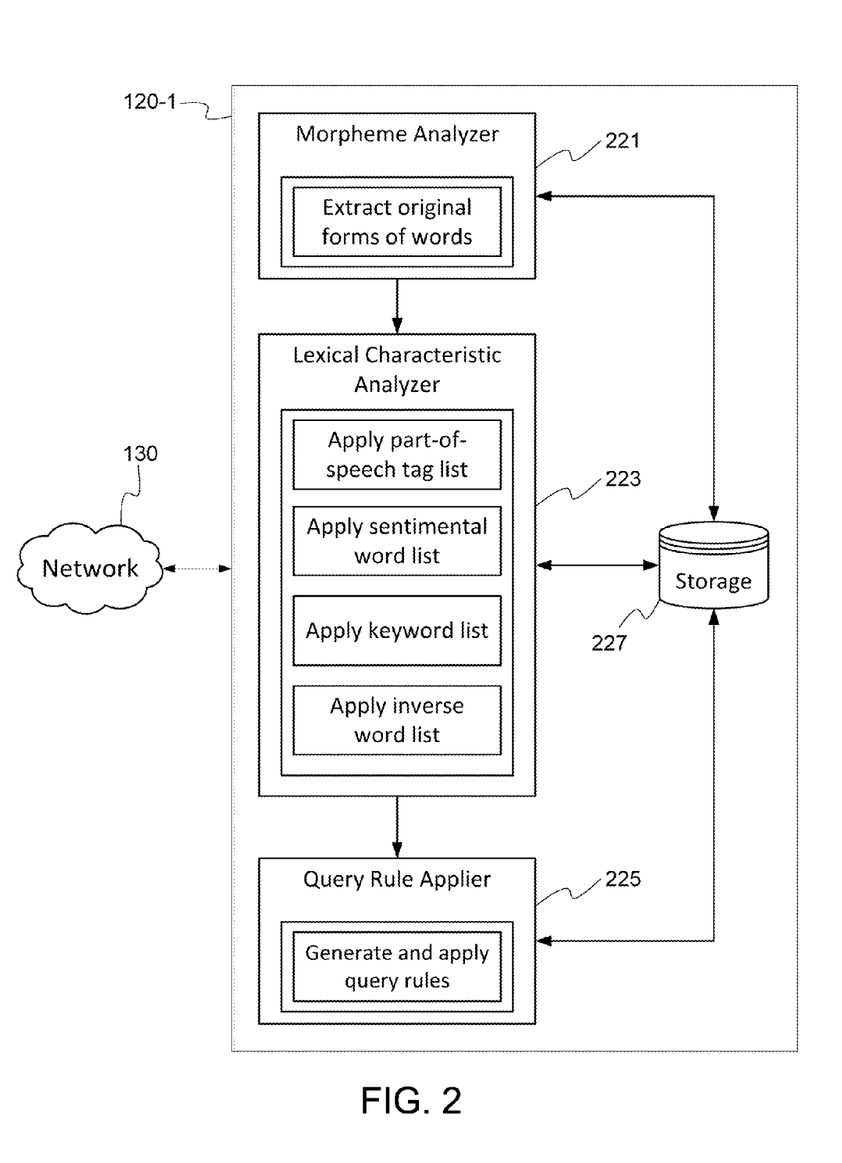
FIG. 2 illustrates a block diagram of a text document classification and analysis server in accordance with an embodiment of the present disclosure.

FIG. 2 illustrates a block diagram of a text document classification and analysis server 120-1 in accordance with an embodiment of the present disclosure. The text document classification and analysis server 120-1 is in communication with the plurality of text document resources 110 of FIG. 1 via the network 130, and includes a morpheme analyzer 221, a lexical characteristic analyzer 223, a query rule applier 225, and a storage unit 227.

In an initial stage of text document classification and analysis, a set of lexicon lists is registered in the storage unit 227. The set of lexicon lists may include a part-of-speech tag list, a sentimental word list, a keyword list for each domain or field, an inverse word list, and so on.

In the part-of-speech tag list, tags are classified according to parts of speech of languages, e.g., Korean, English, etc. For example, tags in English may include noun, verb, adjective, adverb, conjunction, etc. The sentimental word list includes words that generally indicate positive, negative, or neutral feelings or opinions, e.g., good, bad, so-so, etc. The inverse word list includes words that are not useful for text document analysis. The inverse word list is used to limit analysis criteria.

The keyword list includes technical terms used in a domain or field to be analyzed, e.g., sports, arts, legal fields, medical fields, musical fields, and so on. In an embodiment, there is a keyword list for a plurality of domains or fields. In an embodiment, since keywords change depending on the domain or field, the keyword list is made by utilizing validated resources associated with each of the domains or fields. Resources may be validated in a number of ways. For example, a resource may be a peer reviewed article, an article by an expert in the field, or another generally accepted authority associated with the subject matter in the field. A user or analyzer may directly add keywords to the keyword list, or keywords may be added to the keyword list by extracting the keywords using a conventional keyword extraction method that calculates, e.g., the frequency of words.

In an embodiment, the set of lexicon lists is registered at an initial stage of the text document classification and analysis, but embodiments are not limited thereto. In another embodiment, the set of lexicon lists is continuously updated during the text document classification and analysis. For example, new keywords may be added to the keyword list, and/or existing keywords may be deleted from the keyword list based on text document analysis results.

After the registration of the set of lexicon lists, when a text document is input for the text document classification and analysis, the morpheme analyzer 221 extracts an original form, that is, a root word, of words included in the text document by performing morpheme analysis on the words, and tags each of the words based on a corresponding part-of-speech using the part-of-speech tag list stored in the storage unit 227.

The lexical characteristic analyzer 223 determines location information of each of the words in the text document and stores the location information in the storage unit 227. In an embodiment, the location information includes a sequential number applied to each of the words. In an embodiment, the sequential number is applied based on the order of appearance of the word in the text document, i.e., the word order.

The location information of a word is stored in storage regions corresponding to at least one of the part-of-speech tag list, the sentimental word list, the keyword list, and the inverse word list, to which the word belongs. That is, the lexical characteristic analyzer 223 stores location information in the storage unit 227 by sequentially matching each of the words in the text document with the part-of-speech tag list, the sentimental word list, the keyword list, and the inverse word list. The matching process will be described in detail later.

The query rule applier 225 generates query rules for the text document analysis based on lexical characteristics of the words and/or a structural correlation between the words, and analyzes the text document by applying the query rules as analysis categories to the text document. The query rules may be generated by combining target keyword(s), an occurrence of a certain part-of-speech, an occurrence order of words, and so on. In an embodiment, the generated query rules are stored in a query rule table disposed in the storage unit 227. In an embodiment, new query rules may be combined with existing query rules in the query rule table. The user or analyzer may generate new query rules and/or delete existing query rules before or during the text document analysis.

In an embodiment, after the query rules are generated, the query rule applier 225 matches target word(s) included in the query rules with the words in the text document. The query rule applier 225 uses the query rules and the location information of the words stored in the storage unit 227 to analyze the text document. For example, using the location information, it is possible to determine the frequency of words, a combination order of words, a distance between words, and so on. An analysis result of the text document, i.e., whether or not the text document satisfies the query rules, is obtained based on matching results.

Figure 3:
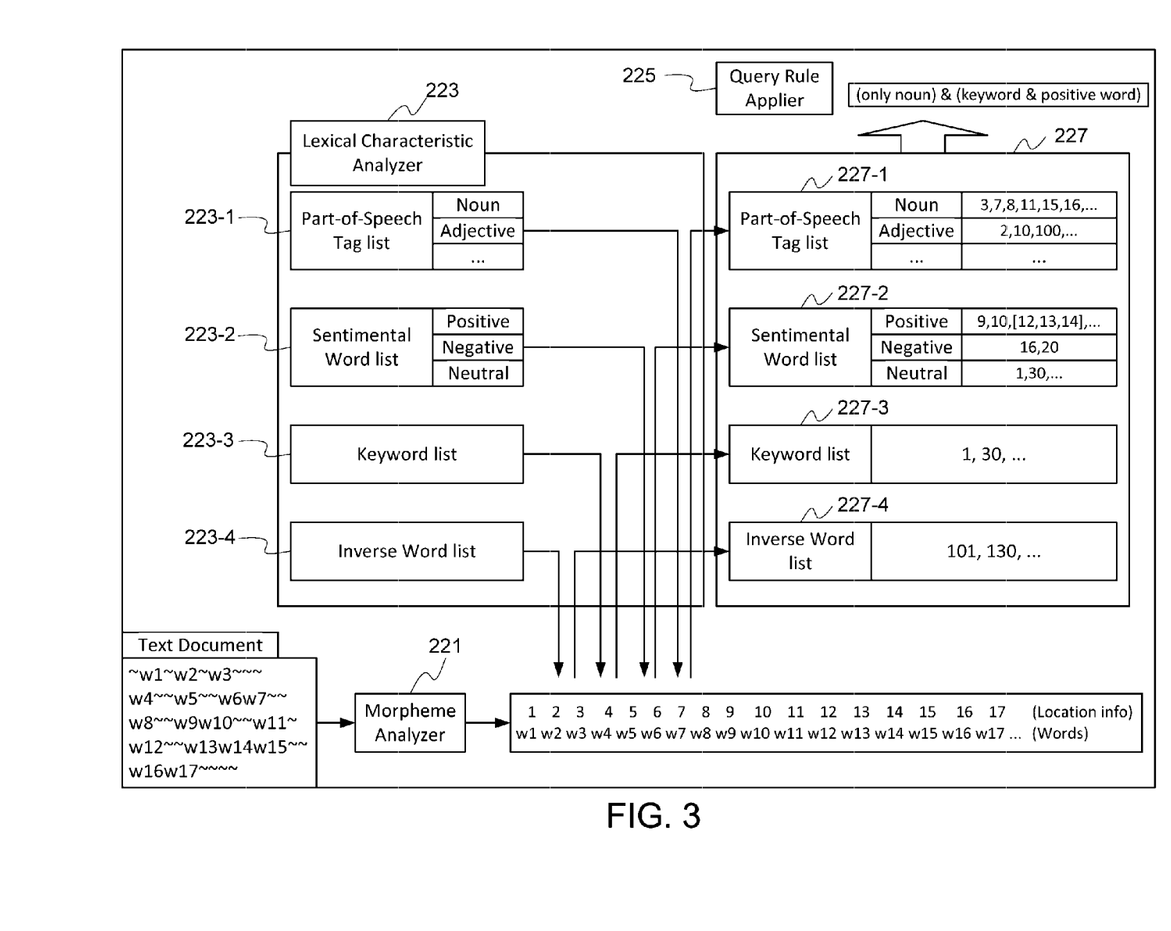
FIG. 3 illustrates operations in a text document classification and analysis server in accordance with an embodiment of the present disclosure.

FIG. 3 is a view illustrating operations of the text document classification and analysis server 120-1 of FIG. 2 in accordance with an embodiment of the present disclosure.

When a text document including a plurality of words is input thereto, the morpheme analyzer 221 extracts original forms of the words and tags each of the original forms of the words based on a corresponding part-of-speech. After that, the lexical characteristic analyzer 223 determines location information of each of the words by sequentially numbering the words according to a word order in the text document.

As a result, for example, the words w1 to w17 included in the text document may have location information of '1' to '17'.

The lexical characteristic analyzer 223 sequentially applies lexicon lists, which are pre-set and include a part-of-speech tag list 223-1, a sentimental word list 223-2, a keyword list 223-3, and an inverse word list 223-4, to the sequentially numbered words, and stores the sequential numbers of the words, i.e., the location information, in corresponding storage regions of the storage unit 227. The part-of-speech tag list 223-1, the sentimental word list 223-2, the keyword list 223-3, and the inverse word list 223-4 may be provided from the storage unit 227 before the text document classification is performed.

Referring to FIG. 3, the $10^{th}$ word w10 is identified as an adjective as well as a positive word. Thus, the location information '10' of the $10^{th}$ word w10 is stored in both an adjective region in a storage table 227-1 for the part-of-speech tag list 223-1 and a positive word region in a storage table 227-2 for the sentimental word list 223-2. Each of the first and $30^{th}$ words is identified as a neutral word as well as a keyword. Therefore, the location information '1' and '30' of the first and $30^{th}$ words are stored in both a storage table 227-3 for the keyword list 223-3 and a neutral word region in the storage table 227-2 for the sentimental word list 223-2. The $101^{st}$ word is identified as an inverse word, and thus its location information '101' is stored in a storage table 227-4 for the inverse word list 223-4. In the same manner, the location information for all the words are stored in at least one storage region of the storage tables 227-1, 227-2, 227-3, and 227-4 according to their lexical characteristics.

After the location information of words in the text document is stored in the storage unit 227, query rules are prepared for the text document analysis. The query rule applier 225 applies the query rules to each of text documents and matches target word(s) in the query rules with words in each of the text documents using the location information of the words stored in the storage unit 227. Thus, an analysis result of the text document, e.g., whether or not the text document satisfies the query rules or how much the text document satisfies the query rules, is obtained based on matching results. FIG. 3 shows an example of query rules, i.e., (only noun) & (keyword & positive word).

In another embodiment, location information of words in a plurality of text documents is stored in respective storage regions of the storage unit 227, and query rules are applied to the plurality of text documents to match target word(s) in the query rules with words in each of the text documents using the location information of the words stored in the storage unit 227. As a result, one or more desired text documents may be obtained from the analyzed text documents.

Figure 4:
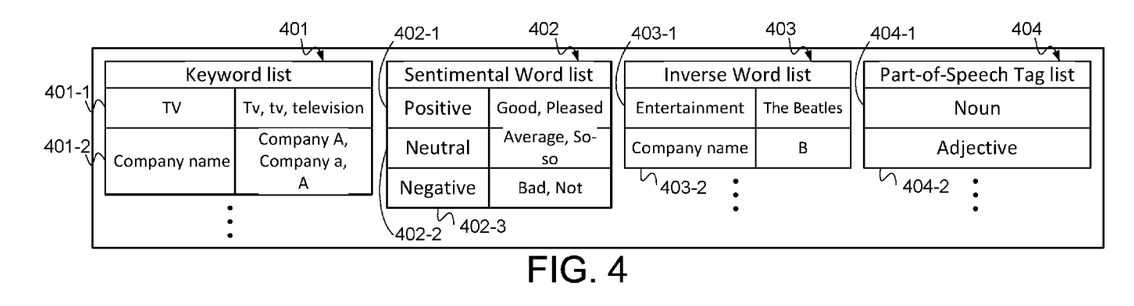
FIG. 4 illustrates logical formats of lexicon lists used for the text document classification in accordance with an embodiment of the present disclosure.

FIG. 4 illustrates logical formats of lexicon lists used for the text document classification and analysis in accordance with an embodiment of the present disclosure. The lexicon lists include a keyword list 401, a sentimental word list 402, an inverse word list 403, and a part-of-speech tag list 404.

Referring to FIG. 4, assuming that the text document classification and analysis is performed to find desired information for a company 'A,' which manufactures televisions (TVs), words such as a company name, product names, and names of members, may be keywords for the text document classification and analysis. Various modifications of the keywords may also be used as keywords. For example, 'TV' can be expressed in various ways, such as 'Tv,' 'tv,' and 'television.' These words are grouped in a list indicated by a representative name 'TV.' Thus, the keyword list 401 includes a plurality of word sections, e.g., a TV section 401-1 and a company name section 401-2 for classifying and analyzing text documents to find the desired information for the company 'A'. As described above, the TV section 401-1 may store variations of 'TV' such as 'Tv,' 'tv,' and 'television' as keywords, and the company name section 401-2 may store 'company A,' 'company a,' and 'A' as keywords.

Similar to the keyword list 401, the sentimental word list 402 stores related words using the representative categories of 'positive,' negative; and 'neutral.' That is, the sentimental word list 402 includes three word sections, e.g., a positive word section 402-1, a neutral word section 402-2, and a negative word section 402-3. As illustrated in FIG. 4, the positive word section 402-1 may store words describing positive feelings or opinions, such as 'good' and 'pleased.' The neutral word section 402-2 may store words describing neutral feelings or opinions, such as 'average,' and 'so-so.' The negative word section 402-3 may store words describing negative feelings or opinions, such as 'bad' and 'not.'

The inverse word list 403 stores words that do not provide information about 'company A' and 'television.' For example, the inverse word list 403 includes a plurality of word sections such as an entertainment section and a company name section. The entertainment section includes entertainment related words including names of popular music groups, e.g., 'The Beatles,' and the company name section includes the names of other companies, e.g., the company name of 'B'. The part-of-speech tag list 404 includes a part-of-speech tag set used in the morpheme analyzer 221 and the lexical characteristic analyzer 223.

Original forms of words are registered in the lexicon lists since original forms of words in a text document are extracted through the morpheme analysis performed in the morpheme analyzer 221. The lexicon lists and/or words registered in the lists may be updated (i.e., deleted/modified). In addition, new lexicon list(s) and/or word(s) may be added even if the text document classification and analysis is in progress.

After the above lexicon lists are prepared for the text document classification and analysis, a target text document is input to the text document classification and analysis server 120-1. After that, as described above, the morpheme analyzer 221 extracts original forms of words in the target text document by performing morpheme analysis on the words. The lexical characteristic analyzer 223 matches the original forms of the words with the lexicon lists and stores location information of the words in corresponding storage regions of the storage unit 227 based on the matching results. The storing of the location information will be described with reference to FIG. 5, which illustrates logical formats of storage regions that store location information of words included in a text document in accordance with an embodiment of the present disclosure.

Figure 5:
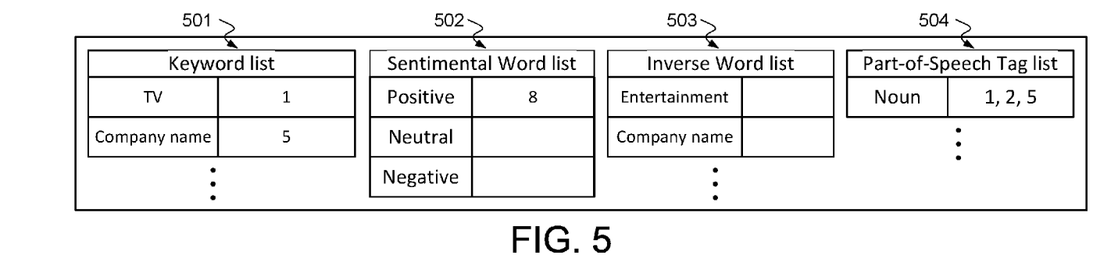
FIG. 5 illustrates logical formats of storage regions storing location information of words included in a text document in accordance with an embodiment of the present disclosure.

For example, when a text document including the sentence, 'TV technologies of a company A seem really good,' is input, the morpheme analyzer 221 extracts original forms of the words in the text document. That is, the morpheme analyzer 221 extracts 'TV', 'technology,' 'of,' 'a,' 'company A,' 'seem,' 'really,' and 'good' by performing morpheme analysis on the text document. The lexical characteristic analyzer 223 determines the location of each of the words in the text document, and stores location information of the words in appropriate regions in the storage unit 227. For example, the words 'TV,' 'technology,' and 'company A', which are each tagged as a noun, appear at a first position (numbered as '1'), a second position (numbered as '2'), and a fifth position (numbered as '5'), respectively, and the word 'good', which is tagged as an adjective and a positive word, appears at an eighth position (numbered as '8'). As a result, the location information, i.e., numbers sequentially applied to the words based on locations of the words in the text document, is stored in storage regions corresponding to the lexicon lists associated with each word in the storage unit 227.

Referring to FIG. 5, since the word 'TV' is a keyword and is tagged as a noun, the location information of the word 'TV,' i.e., the sequential number '1' applied to the word 'TV,' is stored in both a keyword 'TV' region of a storage table 501 for the keyword list 401 and a noun region of a storage table 504 for the part-of-speech tag list 404. Since the word 'company A' is a keyword associated with 'Company name' and is tagged as a noun, the sequential number '5' applied to the word 'company A' is stored in both a keyword 'Company name' region of the storage table 501 for the keyword list 401 and the noun region of the storage table 504 for the part-of-speech tag list 404. Likewise, the sequential number '8' applied to the word 'good' is stored in a positive word region of a storage table 502 for the sentimental word list 402, and the sequential number '2' applied to the word 'technology' is stored in the noun region of the storage table 504 for the part-of-speech tag list 404. Since there is no inverse word in the sentence, no location information is stored in a storage table 503 for the inverse word list 403.

After location information of words included in text documents is stored in the storage unit 227 as described above, the query rule applier 225 generates query rules to analyze the text documents. In an embodiment, the query rules are made using one or more operators (or indicators), e.g., Boolean operators. The operators include, but are not limited to, the following operators (or indicators):

1) FREQ (frequency of a word): The frequency of a certain word is obtained by calculating the number of sequential numbers applied to the certain word whenever the certain word appears in a text document. For example, referring to FIG. 5, a certain noun appears three times at the first, second, and fifth positions of the text document and thus the location information, i.e., the sequential numbers '1', '2', and '5', is stored in the noun region of the storage table 504 for the part-of-speech tag list 404. The frequency of the noun (FREQ noun), which is obtained from the number of the location information stored in the noun region, is 3. A query rule to obtain the frequency of the noun may be a combination of FREQ and noun, e.g., 'FREQ noun.'

2) AND/OR: This operator is used to find a text document including all of the words following the operator or including at least one of words following the operator.

2-1) To find a text document including all of words following an operator, the 'AND' operator is used. For example, in order to find text document(s) including text related to a 'TV' of a 'company A,' a query rule is generated using the 'AND' operator, 'TV,' and 'company A.' By applying the query rule, whether or not both of 'company A' and 'TV' appear in a text document is determined. For the above text document including the sentence 'TV technologies of a company A seem really good,' the location information '1' corresponding to 'TV' and the location information '5' corresponding to 'company A' are both found in the storage unit 227. Therefore, the above text document is selected as a text document satisfying the query rule. The query rule to obtain the above result may be a combination of 'AND,' 'TV,' and 'company A,' e.g., 'AND TV company A.'

2-2) To find a text document including at least one of words following an operator, the 'OR' operator is used. For example, in order to find text document(s) including text related to 'TV' or 'company A,' a query rule is generated using the 'OR' operator, 'TV,' and 'company A.' By applying the query rule, whether or not at least one of 'company A' and 'TV' appears in a text document is determined Since, for the above text document including the sentence 'TV technologies of a company A seem really good,' the location information '1' corresponding to 'TV' and the location information '5' corresponding to 'company A' are stored in the storage unit 227, the above text document is selected as a text document satisfying the query rule. The query rule to obtain the above result may be a combination of 'OR,' 'TV,' and 'company A,' e.g., 'OR TV company A.'

3) ORD (word order): This operator is used to analyze a text document by considering the order of words in the text document. For example, word order is important in determining a 'double negative,' which corresponds to a 'positive' by denying affirmation. In a sentence including words that deny affirmation, a negative word is usually disposed in front of a positive word. According to an embodiment, it is easy to determine whether the following formula is satisfied or not.

Location information of a negative word<location information of a positive word→location information of the positive word−location information of the negative word>0

A query rule implementing the above formula may be 'ORD (negative word) (positive word)', e.g., 'ORD not good.'

4) DIST (distance limit): This operator is used to determine whether or not target words are disposed within a predetermined distance. For example, even though 'double negative' corresponds to 'positive,' if a distance between a first negative word and a second negative word is great, there may not be a correlation therebetween. Therefore, this operator is used to limit a distance between the target words. A query rule using the DIST operator may be 'DIST 3 (first negative word) (second negative word).' Herein, '3' in the query rule represents the number of words between the first negative word and the second negative word. That is, '3' means that there are three words between two target words, i.e., the first negative word and the second negative word.

5) NOT: This operator is used to ignore a certain inverse word or an unnecessary query pattern. For example, a query rule to ignore a word 'idol' is generated as 'NOT idol.' This operator may be combined with a pre-set query rule. For example, to ignore text document(s) including the words 'TV' and 'company A,' the query rule 'AND TV company A' is combined with the operator NOT to generate a query rule 'NOT (AND TV company A).'

Figure 6:
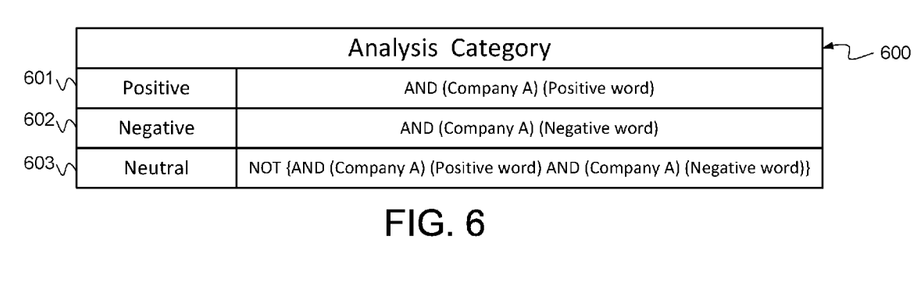
FIG. 6 illustrates a logical format of an analysis category table used for the text document analysis in accordance with an embodiment of the present disclosure.

FIG. 6 illustrates a logical format of an analysis category table 600 including query rules used for the text document analysis in accordance with an embodiment of the present disclosure. The analysis category table 600 includes query rules that may be used to find text documents that include specific feelings or opinions about a company A.

The analysis category table 600 includes three sections 601 to 603 storing query rules for a positive opinion, a negative opinion, and a neutral opinion, respectively. In an embodiment, the first section 601 stores a query rule of 'AND (company A) (positive word),' the second section 602 stores a query rule of 'AND (company A) (negative word),' and the third section 603 stores a query rule of 'NOT {AND (company A) (positive word) AND (company A) (negative word)}.'

In an embodiment, the analysis category table 600 is stored in the storage unit 227, and updated by adding new query rule(s) thereto or deleting existing query rule(s) stored therein. The analysis category table 600 may be modified even during the text document analysis. However, embodiments are not limited thereto. In another embodiment, the analysis category table 600 is stored in another storage unit that is separate from the storage unit 227.

Figure 7:
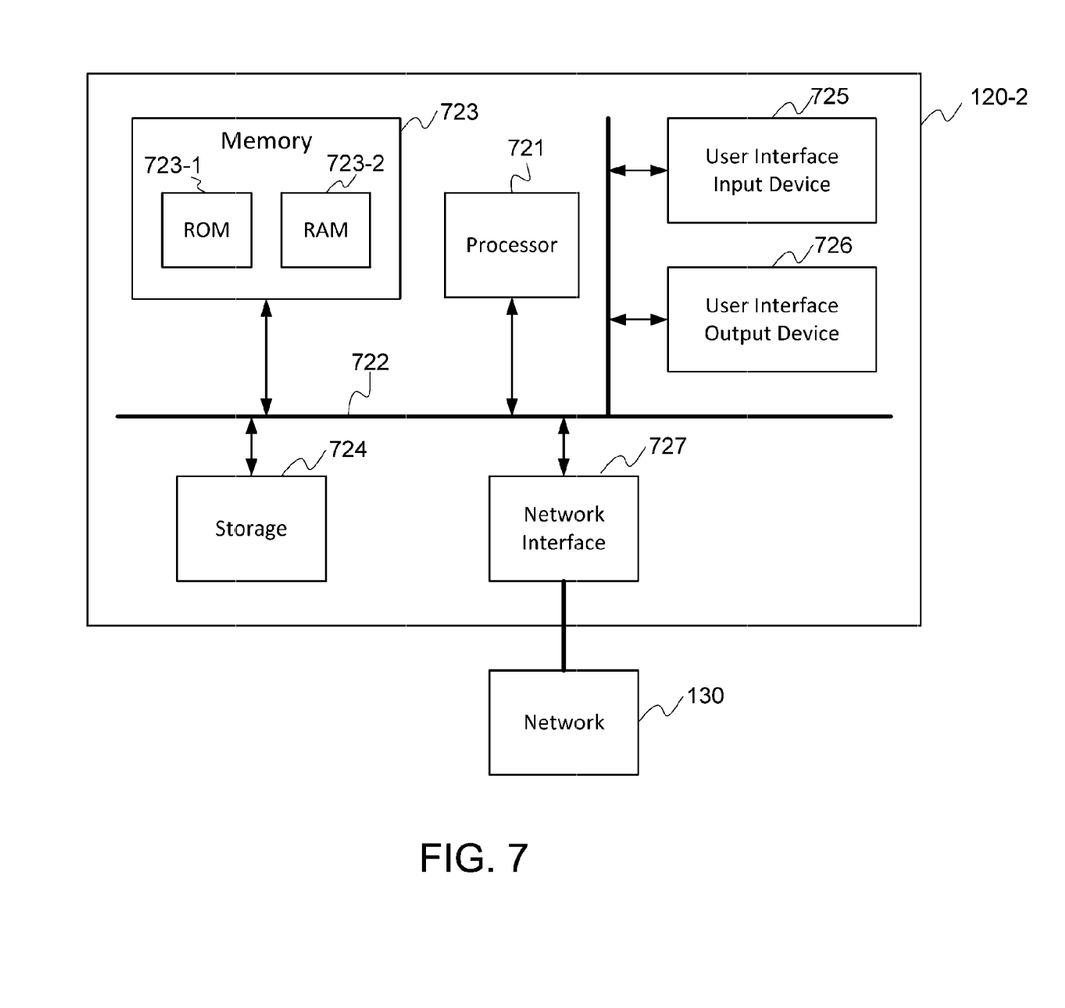
FIG. 7 illustrates a hardware configuration of a text document classification and analysis server according to an embodiment of the present disclosure.

FIG. 7 illustrates a hardware configuration of a computer system that can be used to implement a text document classification and/or analysis server 120-2 according to an embodiment of the present disclosure. The text document classification and analysis server 120-2 includes a processor or CPU 721 that is in communication with a variety of other components via a bus 722. The processor 721 controls operations of the other components, and executes the text document classification and analysis with the other components.

Such other components of the text document classification and analysis server 120-2 include, but are not limited to, a non-transitory computer readable storage medium as a memory 723, including a read only memory (ROM) 723-1 and a random access memory (RAM) 723-2, and also a higher capacity non-transitory computer readable storage medium 724. One or more of these components may be employed by the text document classification and analysis server 120-2 to store computer code including instructions for the text document classification and analysis.

The text document classification and analysis server 120-2 also includes a network interface element 727 to communicate with the network 130. This network interface element 727 is configured to allow information, data, and/or signals to be transmitted between the text document classification and analysis server 120-2 and the network 130. The network interface element 727 may include a receiver and a transmitter. Referring back to FIG. 1, since the text document classification and analysis server 120-2 is coupled to the text document resources 110 via the network 130, such information, data, and/or signals may include text documents to be classified and analyzed by the text document classification and analysis server 120-2.

Moreover, the text document classification and analysis server 120-2 includes a user interface input device 725 and a user interface output device 726. A user or analyzer may communicate with the text document classification and analysis server 120-2 via the user interface input device 725 and the user interface output device 726.

In an embodiment, the user or analyzer provides the text document classification and analysis server 120-2 with new words, new query rules, and/or a command for deleting existing words or query rules through the user interface input device 725. The user interface input device 725 may include a keyboard, pointing devices such as a mouse, trackball, touchpad, or graphics tablet, a scanner, a touchscreen incorporated into a display, or other types of input devices. In general, use of the term "input device" is intended to include all possible mechanisms for inputting information, data, and/or commands to the text document classification and analysis server 120-2.

The user or analyzer may be given information, e.g., analysis results, from the text document classification and analysis server 120-2 via the user interface output device 726. The user interface output device 726 may include a visual output device, such as a display screen, but is not limited thereto. The term "output device" is intended to include all possible mechanisms for outputting information to a user, and may include a visual output device alone, or in combination with any of an auditory output device, such as a speaker, and a haptic output device.

The components of the text document classification and analysis server 120-1 shown in FIG. 2 may be implemented using the components of the text document classification and analysis server 120-2 shown in FIG. 7.

Figure 8:
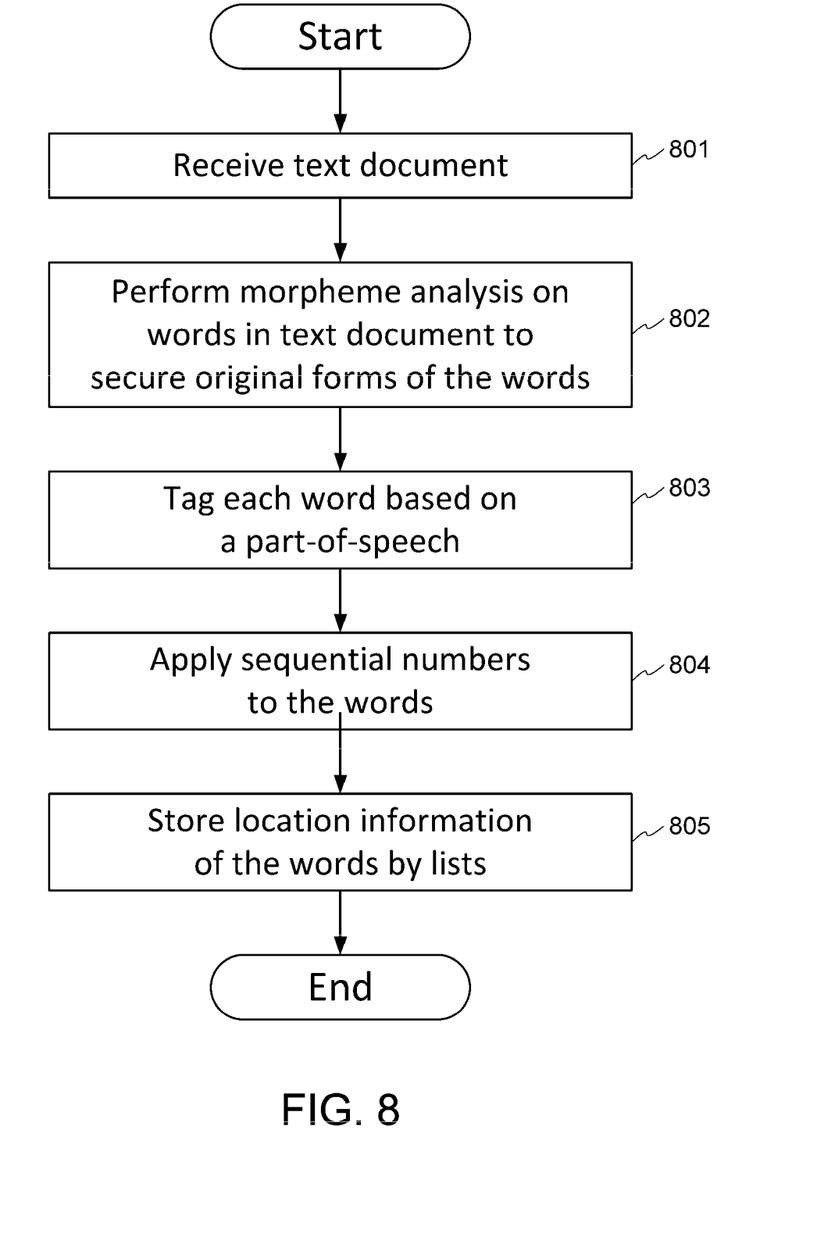
FIG. 8 is a flow chart showing a text document classification method according to an embodiment of the present disclosure.

FIG. 8 is a flow chart showing a text document classification method according to an embodiment of the present disclosure. The text document classification method will be described with reference to FIG. 2.

At 801, the text document classification and analysis server 120-1 receives a text document including a plurality of words from the text document resources 110 via the network 130.

At 802, the morpheme analyzer 221 performs morpheme analysis on the words in the text document to extract original forms of the words.

At 803, the morpheme analyzer 221 tags each of the words based on a corresponding part-of-speech using the part-of-speech tag list.

At 804, the lexical characteristic analyzer 223 applies a sequential number to each of the words according to a word order in the text document.

At 805, the lexical characteristic analyzer 223 stores location information, i.e., the sequential numbers, of the words in the storage unit 227. The lexical characteristic analyzer 223 sequentially applies a part-of-speech tag list, a sentimental word list, a keyword list for each domain or field, and an inverse word list to the text document to determine which of the sequentially numbered words corresponds to a word registered in each of the respective lists. If a numbered word corresponds to a word registered in a specific list, then the location information of the word is stored in a region of the storage unit 227 that corresponds to that specific list. After storing the location information, the text document classification is terminated.

Figure 9:
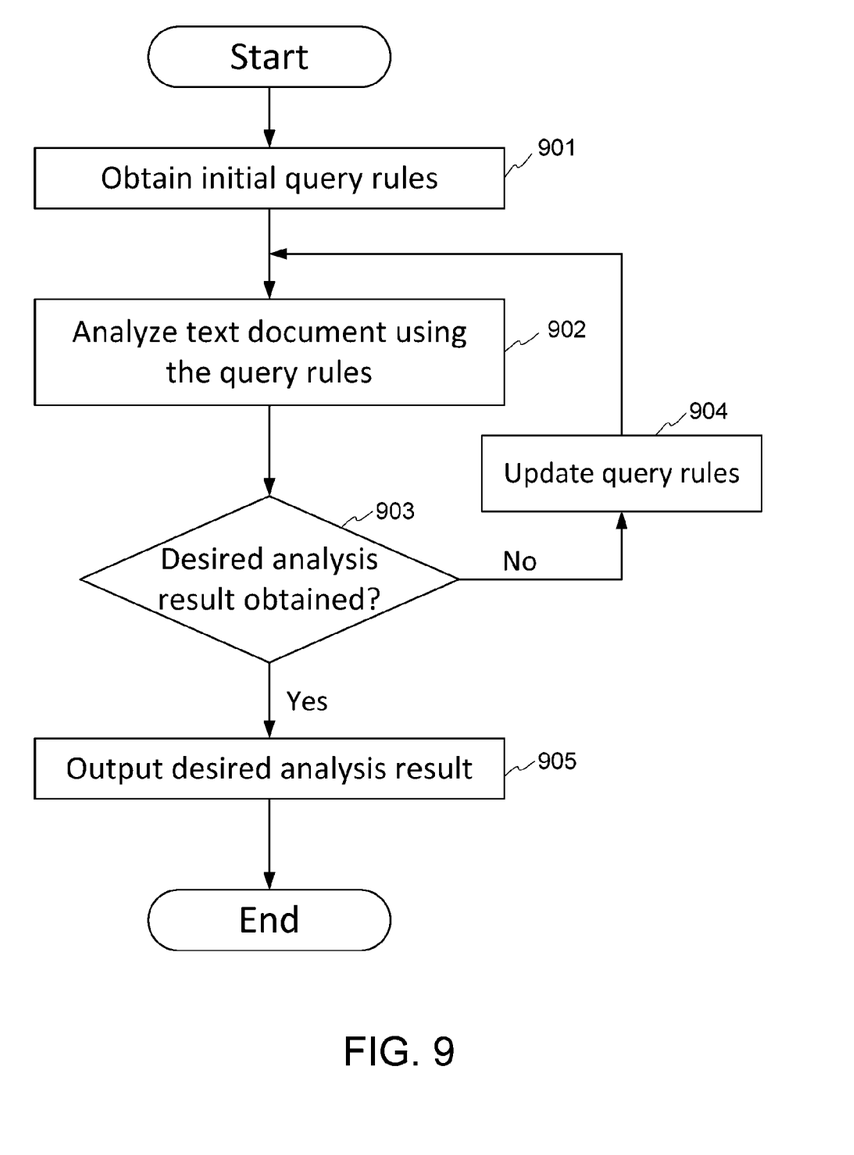
FIG. 9 is a flow chart showing a text document analysis method according to an embodiment of the present disclosure.

FIG. 9 is a flow chart showing a text document analysis method according to an embodiment of the present disclosure. The text document analysis method will be described with reference to FIG. 2.

At 901, the text document classification and analysis server 120-1 obtains initial query rules by retrieving query rules stored in the storage unit 227 or receiving query rules input by the user or analyzer.

At 902, the query rule applier 225 applies the initial query rules to text documents classified by the morpheme analyzer 221 and the lexical characteristic analyzer 223. The query rule applier 225 analyzes the text documents based on location information of words in the text documents, the location information being stored in the storage unit 227.

At 903, analysis results are output. In an embodiment, the analysis results indicate which text documents satisfy the query rules. In an embodiment, the analysis results indicate whether any text documents satisfy the query rules. In an embodiment, the analysis results are output to a user device so that the user or analyzer can evaluate the analysis results. The analysis results provided to the user device may include a display of a list of text documents satisfying the query rules that the user or analyzer may select. If any text document from the displayed list is selected, the selected text document is provided to the user or analyzer as desired analysis results at 905. If the user or analyzer is satisfied with the analysis results, text document analysis may be completed after the analysis results are output.

If it is determined that desired analysis results have not been obtained, the user or analyzer modifies query rules at 904, and then the query rule applier 225 applies modified query rules to the text documents to analyze the text documents again.

In accordance with embodiments of the present disclosure, the foregoing methods may be implemented as code that can be read by a computer and stored on a non-transitory computer-readable medium. The computer-readable medium may include any type of recording device in which data that can be read by a computing system is stored. The computer-readable medium may include a ROM, a RAM, a CD-ROM, a magnetic tape, a floppy disk, an optical data storage device, and the like. The computer-readable recording medium may be distributed over network-coupled computer systems so that the computer-readable code may be stored and executed in a distributed fashion.

The broad teachings of the present disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A document classification and analysis system, comprising:
 a processor;
 a memory including two or more storage regions; and
 a non-transitory computer-readable medium having stored thereon instructions that, when executed, cause the processor to perform a method, the method comprising:
  receiving a document including a plurality of words;
  performing morpheme analysis on the document to extract original forms of the words;
  tagging each of the words based on a corresponding part-of-speech;
  determining location information of each of the words based on an order of the words in the document;
  applying two or more different types of word lists to the words in the document to classify each of the words; and
  storing the location information,
 wherein the location information of each of the words is stored in at least one of the two or more storage regions in the memory based on the classification of the words, the two or more storage regions storing the two or more different types of word lists in the form of tables, respectively, and
 wherein the two or more different types of word lists are used in combination to apply a query rule to the document.

2. The document classification and analysis system of clam 1, wherein the two or more different types of lists comprise two or more of a part-of-speech tag list, a sentimental word list, a keyword list, and an inverse word list.

3. The document classification and analysis system of clam 2, wherein the keyword list includes one or more sections, each section corresponding to a field, and
 wherein keywords in each section are generated based on validated resources associated with the corresponding field.

4. The document classification and analysis system of clam 1, wherein determining the location information further comprises applying a sequential number to each of the words based on the order of the words, and
wherein the location information of each word includes the sequential number applied to said each word.

5. The document classification and analysis system of claim 1, wherein the non-transitory computer-readable medium further comprises instructions that, when executed, cause the processor to:
apply at least one query rule to at least one document including words;
determine whether or not the document satisfies the query rule; and
output a document analysis result, the document analysis result including a result of the determination of whether or not the document satisfies the query rule,
wherein the query rule is applied to the document using the location information of the words stored in the memory.

6. The document classification and analysis system of clam 5, wherein any of the two or more different types of word lists and query rules to be applied to the document are updated based on the document analysis result.

7. The text document classification and analysis system of clam 5, wherein the query rule includes at least one Boolean operator and at least one target word.

8. The document classification and analysis system of clam 5, wherein the query rule is defined by a correlation between target words based on the location information of the target words.

9. A document classification and analysis method, comprising:
receiving a document including a plurality of words;
performing morpheme analysis on the words of the document to extract original forms of the words;
tagging each of the words based on a corresponding part-of-speech;
determining location information of each of the words based on an order of the words in the document;
applying two or more different types of word lists to the words in the document to classify each of the words; and
storing the location information in a storage unit based on the classification of the words,
wherein storing the location information comprises storing the location information of each of the words in two or more storage regions in the storage unit, the two or more storage regions storing the two or more different types of word lists in the form of tables, respectively, and
wherein the two or more different types of word lists are used in combination to apply a query rule to the document.

10. The document classification and analysis method of clam 9, wherein determining the location information comprises:
sequentially numbering each of the words according to the order of the words,
wherein the location information of each word includes the sequential number applied to said each word.

11. The document classification and analysis method of clam 9, wherein the two or more different types of word lists comprise two or more of a part-of-speech tag list, a sentimental word list, a keyword list, and an inverse word list.

12. The document classification and analysis method of clam 11, wherein the keyword list includes sections corresponding to fields, and wherein keywords in the sections are generated based on validated resources associated with the corresponding fields.

13. The document classification and analysis method of clam 9, further comprising:
applying one or more query rules to a plurality of documents including the document to determine whether or not each of the documents satisfy each of the query rules; and
outputting the determination results as document analysis results.

14. The document classification and analysis method of clam 13, wherein the query rules use location information of words of the documents that is stored in the storage unit.

15. The document classification and analysis method of clam 13, wherein any of the query rules and the two or more different types of word lists are updated based on the document analysis results.

16. The document classification and analysis method of clam 13, wherein each of the query rules includes at least one Boolean operator and at least one target word.

17. The document classification and analysis method of clam 13, wherein the query rules comprise one or more query rules defined by a correlation between target words based on the location information of the target words.

18. A non-transitory computer readable medium having a computer program for causing a computer to perform document classification and analysis, the computer readable medium comprising:
code for receiving a document including a plurality of words;
code for extracting original forms of the words;
code for tagging each of the words based on a corresponding part-of-speech;
code for determining location information of each of the words based on an order of the words in the document;
code for applying two or more different types of word lists to the words in the document to classify the words;
code for storing the location information based on the classification of the words;
code for applying one or more query rules to a plurality of documents including the document;
code for determining documents, which satisfy each of the query rules, among the plurality of documents; and
code for outputting desired documents selected from the determined documents,
wherein the location information of each of the words is stored in at least one of two or more storage regions in a memory, the two or more storage regions storing the two or more different types of word lists in the form of tables, respectively, and
wherein the two or more different types of word lists are used in combination to apply the one or more query rules to the documents.

* * * * *